United States Patent [19]

deGaston

[11] 4,135,090

[45] Jan. 16, 1979

[54] LIQUID IONIZING RADIATION DETECTOR

[76] Inventor: Alexis N. deGaston, 2190 Santa Anita Rd., Norco, Calif. 91760

[21] Appl. No.: 797,511

[22] Filed: May 16, 1977

[51] Int. Cl.² .............................................. G01T 1/00
[52] U.S. Cl. .................................... 250/336; 250/389
[58] Field of Search .................. 250/336, 335, 315 A, 250/389

[56] References Cited

U.S. PATENT DOCUMENTS 3,873,833  3/1975  Allan et al. ...................... 250/336 X

*Primary Examiner*—Davis L. Willis
*Attorney, Agent, or Firm*—George W. Finch

[57] ABSTRACT

A normally nonconducting liquid such as liquid hydrocarbon is encased between a pair of electrodes in an enclosure so that when the liquid is subjected to ionizing radiation, the ion pairs so created measurably increase the conductivity of the fluid. The reduced impedance between the electrodes is detectable with a sensitive ohm-meter and indicates the amount of ionizing radiation. The enclosure, the electrodes and the fluid can be constructed of materials that make the response of the detector suitable for calibrating a large range of radiation energy levels. The detector is especially useful in medical applications where tissue equivalent X ray detectors are desired.

14 Claims, 4 Drawing Figures

U.S. Patent  Jan. 16, 1979  4,135,090
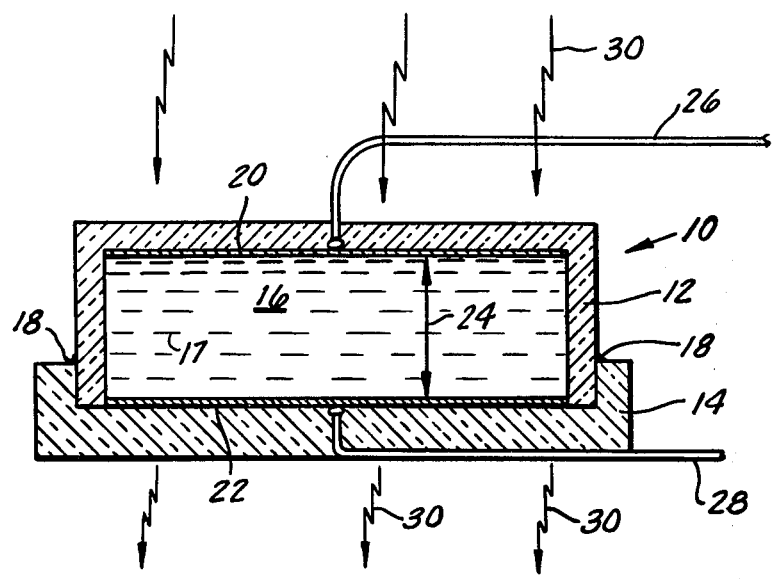
FIG_1
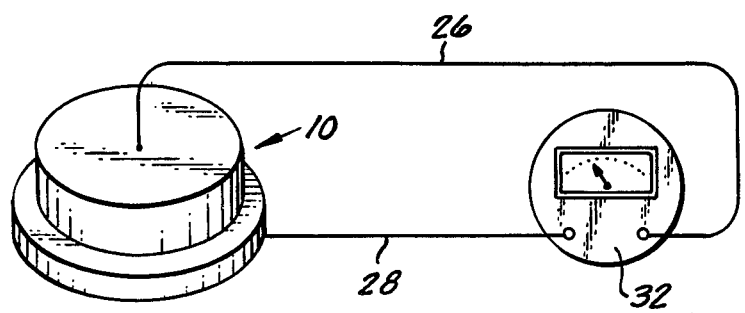
FIG_2
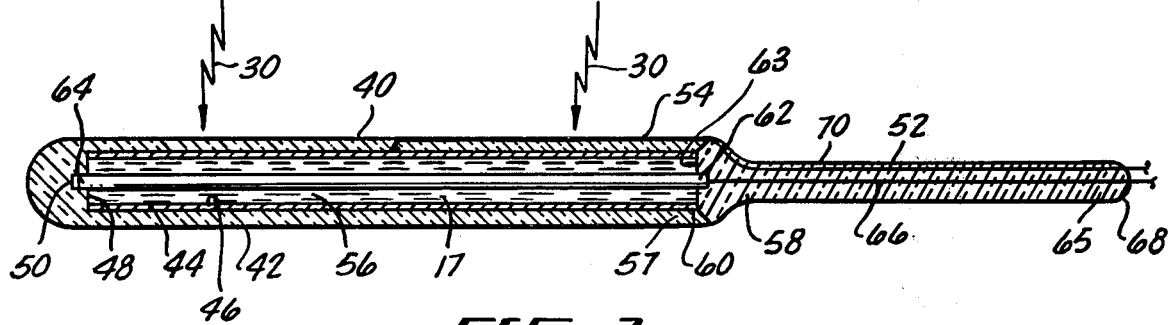
FIG_3
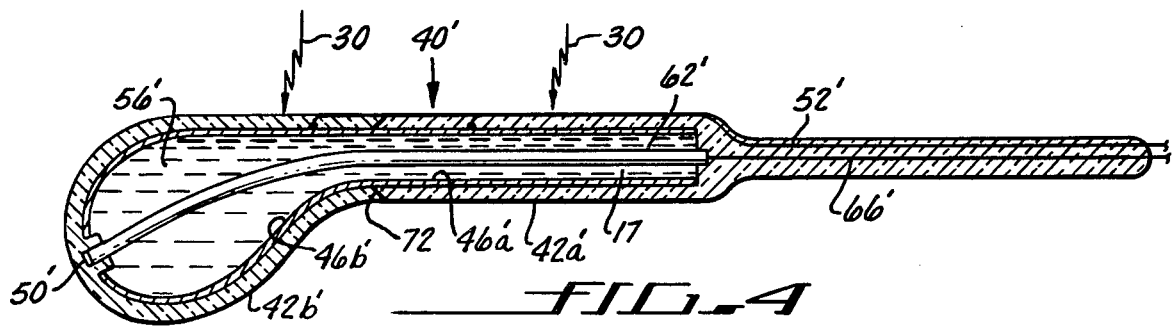
FIG_4

LIQUID IONIZING RADIATION DETECTOR

CROSS-REFERENCE TO RELATED PATENT

This patent relates to the subject matter of U.S. Pat. No. 3,784,876 entitled STATIC DECHARGER by the present Applicant and reference is made thereto as though fully set forth hereinbelow.

BACKGROUND OF THE INVENTION

Detectors to enable calibration of radiation producing equipment are well known in the art. Typical detectors are manufactured by th Victoreen Instrument Division of V & L, Cleveland, Ohio. However, no detectors in the prior art are true human tissue equivalents. When it is desired to calibrate high energy electron and/or photon beams such as those used in the treatment of cancer, the standard method is to use an air ionization chamber in a water phantom. The beam intensity is then calculated by the use of theoretical relationships using theoretically calculated electron stopping power ratios.

The air in an air chamber is about 1000 times less dense than actual tissue so that the volume of the detector or probe needs to be about 1000 times larger than the volume of tissue that acquires the same energy deposition by ionization. Such a large probe disrupts the radiation field fluence, and the secondary electron flux and introduces error into the measurement system.

In other applications it is also desirable that the radiation measuring probe or detector be equivalent to the structure to be subjected to radiation so that theoretical correction factors and other inaccuracies do not have to be employed.

BRIEF SUMMARY OF THE INVENTION

By using a detector constructed according to the present invention, true tissue or other material equivalent probes can be constructed so that a correct direct dose calibration of radiation can be made. Also, because of its direct tissue equivalency, the present detector does not needlessly disturb the radiation field and therefore, produces more accurate results.

The detector itself is built around the principle that the irradiation of nonconductive fluids such as clean hydrocarbons, produce ion pairs which measurably increase the conductivity of the fluid. In the preferred embodiment of the present invention, a hydrocarbon or hydrocarbon mixture of a density similar to the density of the material for which it is to be the equivalent, is encased between two electrodes in an enclosure constructed from a material such as polymerized plastic which will not desolve and dirty the hydrocarbon and which has a very high resistivity. When a suitable depth of hydrocarbon is present between the electrodes, a change in impedance thereof is a direct indication of the amount of ionizing radiation impinging on the hydrocarbon. The invention, therefore, can be used directly to control theraputic radiation treatment and to calibrate various radiation producing instruments such as X-ray machines and machines which produce beams of electrons, neutrons or other such particles. In the case of a tissue equivalent detector, the volume of the liquid required can be a 1000 times less than that of the air in the standard air ionization chamber. Therefore, direct readable, tissue equivalent probes can be constructed for placement within the human body, something that has not been possible heretofore.

It is therefore an object of the present invention to provide radiation detectors which can be constructed to have a predetermined equivalent density over a wide range of densities.

Another object is to decrease the cost and increase the accuracy of radiation measurements, especially those useful in the medical treatment of human beings.

Another object is to reduce the size of tissue equivalent and general purpose radiation detectors.

Another object is to provide direct reading radiation detectors of high accuracy which are relatively easy to use.

Another object is to provide radiation detectors which can be positioned within the radiation field during the treatment of a human without materially affecting the field to thereby indicate directly the radiation being received by the patient.

These and other objects and advantages of the present invention will become apparent to those skilled in the art after considering the following detailed specification which discloses preferred embodiments thereof in conjunction with the accompanying drawing.

BRIEF DESCRIPTION OF THE DRAWING

FIG. 1 is a cross-sectional view of a typical radiation detector constructed according to the present invention;

FIG. 2 illustrates the normal detection circuitry for the detector of FIG. 1; and FIG. 3 shows an alternate construction of the present invention particularly useful as a probe for insertion in body cavities.

FIG. 4 shows a side view of the alternate construction of said probe.

DETAILED DESCRIPTION OF THE PREFERRED EMBODIMENTS

Referring to the drawing more particularly by reference numbers, number 10 in FIG. 1 refers to a radiation detector constructed according to the present invention. The detector 10 includes upper and lower nestable case members 12 and 14 which define a chamber 16 therebetween which chamber is filled with a predetermined liquid 17 which is relatively nonconductive. Once the chamber 16 is filled with liquid, case members 12 and 14 are sealed such as by heat welding a bead 18 as shown. Since it is important that the fluid 17 within the chamber 16 remains nonconductive, the case members 12 and 14 are preferably constructed from a highly stable material. When the radiation detector 10 is to be used as a tissue equivalent detector, plastics formed in a polymerization process are preferred choices so long as the atomic number of the plastic is approximately the same as the atomic number of tissue. The upper and lower case members 12 and 14 also include electrode plates, 20 and 22 respectively, which are shown as parallel plates of a predetermined spacing 24. The proper spacing 24 is determinable as a function of the insulative qualities of the fluid within the chamber 16, the radiation intensities to be measured, and the sensitivity of the ohmmeter used to measure the impedance thereof. The plates 20 and 22 may be metallic or conductive non-metallic films. In the case of tissue equivalent detectors, conductive graphite films are especially advantageous because graphite is more tissue equivalent than most metals. However, in those cases where it is desired to detect fast electron flux build up from the incident radiation, metals are preferable because of their higher atomic numbers. The plates 20 and 22 are electrically connected through the case members 12 and 14 by wires 26 and 28 as shown in FIG. 1. It is generally preferable that the wires 26 and 28 are connected to the plates 20 and 22 at central locations thereof, especially when relatively poor conductors are used to make the plates. This assures that a true average of the radiation 30 passing through the detector 10 is measured.

High mobility of the ions in the liquid created by the radiation 30 is also desired to reduce transient times and to assure a true average for tissue equivalent detectors 10. Hexane is particularly advantageous especially when transient phenomena are to be measured. In some situations detectors filled with butane under high pressure might even be desirable but in most instances a hydrocarbon in the pentane-pentadecane range is most practical because of reasonable room temperature vapor pressures.

Other desired liquid characteristics such as the ability to be formed free of conductive contaminates and the lack of soluability of conductive contaminates also make hydrocarbons the preferable liquids 17 to be placed within the chamber 16. Hydrocarbons can be acquired in relatively pure states having a wide range of atomic weights and may be doctored with various high atomic number substitutions such as the halogens so that the equivalent detectors over a wide range of densities and atomic number can be constructed. However, the primary requirement for the liquid 17 is that it has a high resistance. Resistivities in the order of $10^{14}$ to $10^{15}$ ohm-meters or more are highly desired so that the intrinsic conductivity is small compared to the radiation induced conductivity. Clean hydrocarbon liquids typically have resistivities of this order. Sensitivity to radiation of less than about 500keV effective X-ray or gamma-ray energy can be increased by using liquids or solutions with high atomic number components. On the other hand, liquids with a mean effective atomic number equal to that of body tissue or water and a density nearly that of tissue are the most useful in probes used to calibrate medical therapy or diagnostic equipment. With the range of suitable hydrocarbons available, detectors 10 can be built to better fit present requirements than the old solid sintillition probes, germanium crystals and air ionization chambers.

A typical detection circuit is shown in FIG. 2 with the detector 10 being connected by the wires 26 and 28 to a sensitive ohmmeter 32. Ohmmeters 32 of suitable sensitivity are available commercially or may be designed and built of commercially available components to suit instrument design purposes.

FIG. 3 shows a detector probe 40 using the principles of the detector 10 discussed above but in a configuration better suited for insertion into body cavities. The detector probe 40 also is preferably constructed from the materials discussed above with the choice of materials being dependent upon the intended use. The probe 40 can be constructed from a tube 42 having a cylindrical inner surface 44 on which a conductive layer 46 is formed, such as by spraying. The inner most end 48 of the surface 44 is then milled to eliminate any conductive layer that might be present after the spraying operation. At the same time, a center depression 50 can be constructed. A wire 52 is then connected to the conductive layer 46 preferably centrally and the wire 52 is flush with the surface at point 54 at the upper end of the tube. The tube 42 is then immersed in the liquid 17 to fill the chamber 42 defined within the layer 46 and a plug member 58 is sealably connected such as by joints 60 to enclose the liquid 17. The plug member 58 like case members 12 and 14 and the tube 42 is required to present a nonconductive interface to the liquid. However the member 58 may not need be constructed from tissue equivalent materials since it is not normally in the direct path of the radiation 30 to be detected.

A conductive or conductively coated rod 62 is positioned extending outwardly from the chamber enclosing surface 63 of the plug member 58. The other end 64 of the rod 62 preferably nests in the depression 50 when the tube 42 and the plug member 58 are connected together. This assures that the rod 62 is coaxially retained within the layer 46. The rod 62 is electrically connected out of the opposite end 65 of the plug member 58 by means of a wire 66. The wire 52 can also be routed along this path by means of insertion in the depression 70 in the surface of plug member 58 which aligns itself with the depression 54 in the tube member 42.

It should be apparent that instead of having two parallel plates, the probe detector 40 is a coaxial detector so that the decreased resistivity of the fluid within the chamber 56 is detected between the rod 62 and the conductive layer or sheath 46. In such a construction it may be desirable that the rod 62 be constructed from a metal for structural reasons and increased sensitivity at low X-ray energies when tissue equivalence is not critical. The sheath 46 through which all of the radiation 30 must pass to be detected, may be a thin metallic film when very high X-ray energies are to be measured or to increase sensitivity at low energies, or a graphite film when the closer tissue equivalent of graphite is desired. The output of the detector probe 40 is measured by a suitable ohmmeter 32 such as shown in FIG. 2.

The probe 40 of FIG. 3 and FIG. 4 can also be constructed to be a phantom of an internal organ such as the pancreas shaped probe 40' whose parts similar to those of probe 40 have the same number with a prime (') added thereto. The probe 40' has the same physical constraints on materials as the probe 40 and detector 10 with suitable materials being chosen to make a true tissue equivalent. The probe 40' is constructed by forming the conductive sheaths 46a' and 46b' on the inside surface of the tube halves 42a' and 42b'. The wire 52' is connected to the sheaths 46a' and 46b' and the center conductive rod 62' is connected to wire 66'. The chamber 56' is filled with fluid 17 by emersion and the tube halves 42a' and 42b' are sealed together about the joint 72 taking care that the conductive rod 62' is restrained in the depression 50'.

It should be apparent that detectors of many configurations can be constructed using the principles outlines hereinabove. That is, radiation detectors having the desired equivalency can be constructed by merely varying the materials therein in accordance with the present invention. It should also be apparent that many nonconductive liquids which are not hydrocarbons may be advantageous if they are available commercially at a relatively economic cost.

Thus there has been shown and described novel radiation detectors for increasing the accuracy of radiation measurements which fulfill all of the objects and advantages sought therefor. Many changes, modifications, variations, other uses and applications of the subject invention will, however, become apparent to those skilled in the art after considering this specification and the accompanying drawing. All such changes, modifications, variations and other uses and applications which do not depart from the spirit and scope of the invention are deemed to be covered by the invention which is limited only by the claims which follow.

What is claimed is:

1. A detector for measuring the irradiation of a substance by ionization of molecules in a liquid comprising:
   at least one member forming a chamber;
   a relatively nonconductive ionizable liquid located within said chamber, said liquid being substantially equivalent to the material being irradiated; and
   at least one pair of spaced electrodes in electrical communication with said liquid.

2. The detector defined in claim 1 wherein said detector is constructed to be equivalent to material through which the radiation to be measured normally passes, said liquid being selected to have a similar atomic number and density as the material.

3. The detector defined in claim 2 wherein said member forming a chamber is constructed from polymerized plastic having an atomic number and density similar to the atomic number and density of the material.

4. The detector defined in claim 3 wherein said material is human tissue, said electrodes being constructed from conductive graphite.

5. The detector defined in claim 1 wherein said liquid is hydrocarbon.

6. The detector defined in claim 5 wherein said hydrocarbon includes at least one hydrocarbon selected from the hydrocarbon group consisting of each successive hydrocarbon compound from butane to pentadecane inclusive.

7. The detector as defined in claim 5 wherein said liquid further includes atoms selected from at least one of the halogens.

8. The detector defined in claim 1 wherein said spaced electrodes are parallel plates constructed from a material having a relatively high electrical conductivity with respect to said liquid.

9. The detector defined in claim 8 wherein said electrodes include conductors for connecting said parallel plates to conductivity measuring means.

10. The detector defined in claim 1 wherein said spaced electrodes are a conductor and a conductive sheath thereabout.

11. The detector defined in claim 10 wherein said conductive sheath is cylindrical in shape and said conductor is mounted coaxially therewithin.

12. A method for measuring the radiation passing a given location including the steps of:
    retaining a nonconductive ionizable liquid in the given location of substantial equivalency in atomic number and density to the environment through which said radiation passes; and
    measuring the increase in conductivity of said ionizable liquid which occurs when said liquid is subjected to radiation.

13. The method defined in claim 12 wherein human tissue is the material of interest, and said liquid includes at least one hydrocarbon selected from the hydrocarbon group consisting of each successive hydrocarbon compound from butane to pentadecane inclusive.

14. The method defined in claim 13 wherein said retention of said liquid is within a container so constructed and arranged such that said liquid is supported within a human body.

* * * * *